United States Patent [19]

Kinsley

[11] 4,178,146
[45] Dec. 11, 1979

[54] MOLD HAVING CUTTER MEANS

[75] Inventor: John P. Kinsley, Hanover Park, Ill.

[73] Assignee: The Continental Group, Inc., New York, N.Y.

[21] Appl. No.: 615,272

[22] Filed: Sep. 22, 1975

[51] Int. Cl.² .......................... B29F 5/00; B29D 23/03
[52] U.S. Cl. ................................... 425/289; 425/296; 425/308; 425/510
[58] Field of Search ......... 83/914; 425/302 B, 806 A, 425/DIG. 212, 289, 296, 308, 510

[56] References Cited
U.S. PATENT DOCUMENTS

| | | | |
|---|---|---|---|
| 3,224,038 | 12/1965 | Budesheim | 425/DIG. 212 |
| 3,869,237 | 3/1975 | Hellmer et al. | 425/302 B |
| 3,869,239 | 3/1975 | Confer | 425/302 B |
| 3,910,742 | 10/1975 | Lynn | 425/302 B |

*Primary Examiner*—Richard B. Lazarus
*Attorney, Agent, or Firm*—H. Lawrence Smith; Charles E. Brown; Joseph E. Kerwin

[57] ABSTRACT

A mold provided with cutter means movable relative to the other elements of the mold to sever an extension portion of a hollow article formed in the mold from the remainder thereof while the article is in the mold and without effecting substantial movement of the article relative to the mold.

10 Claims, 7 Drawing Figures

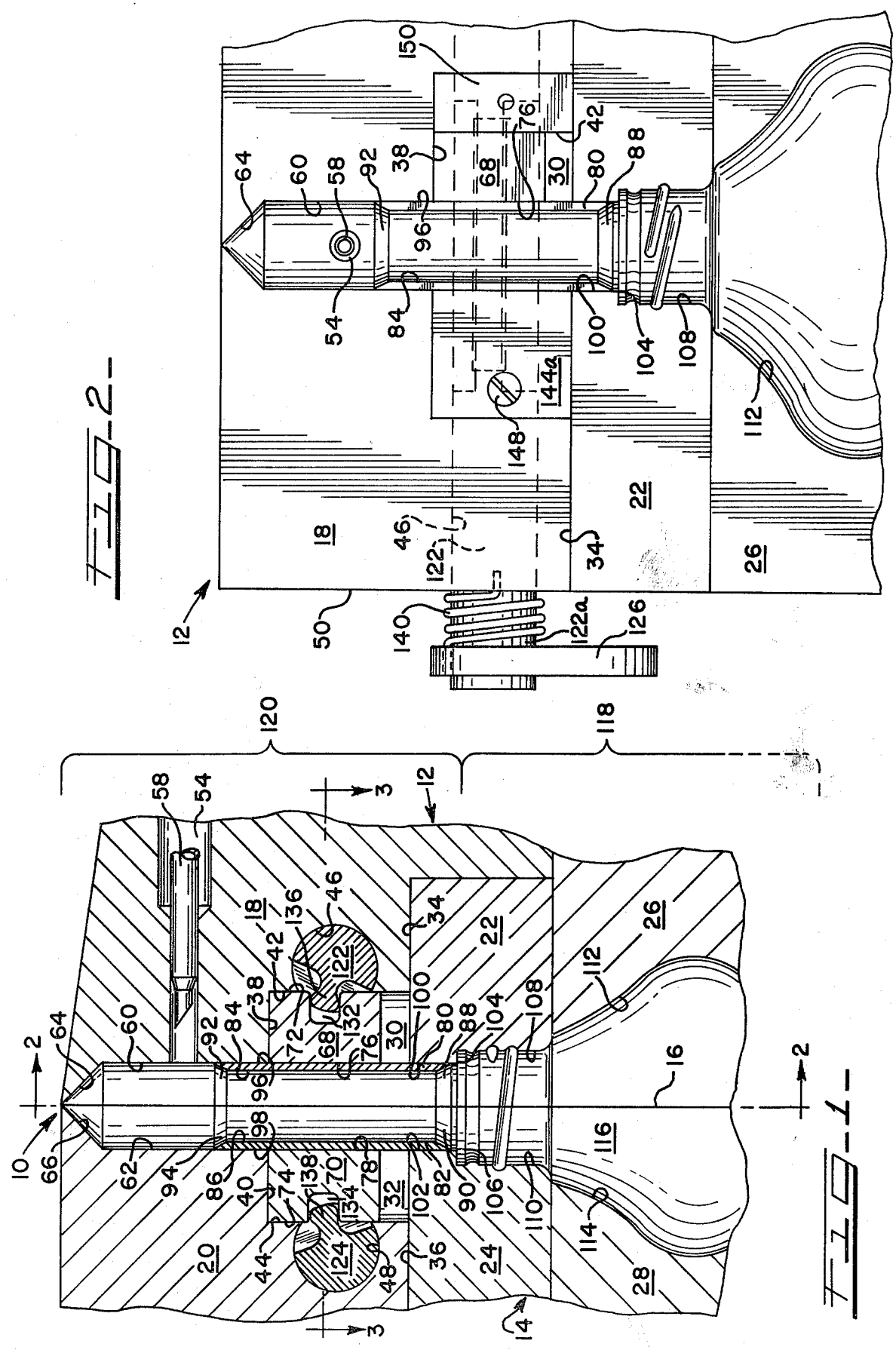

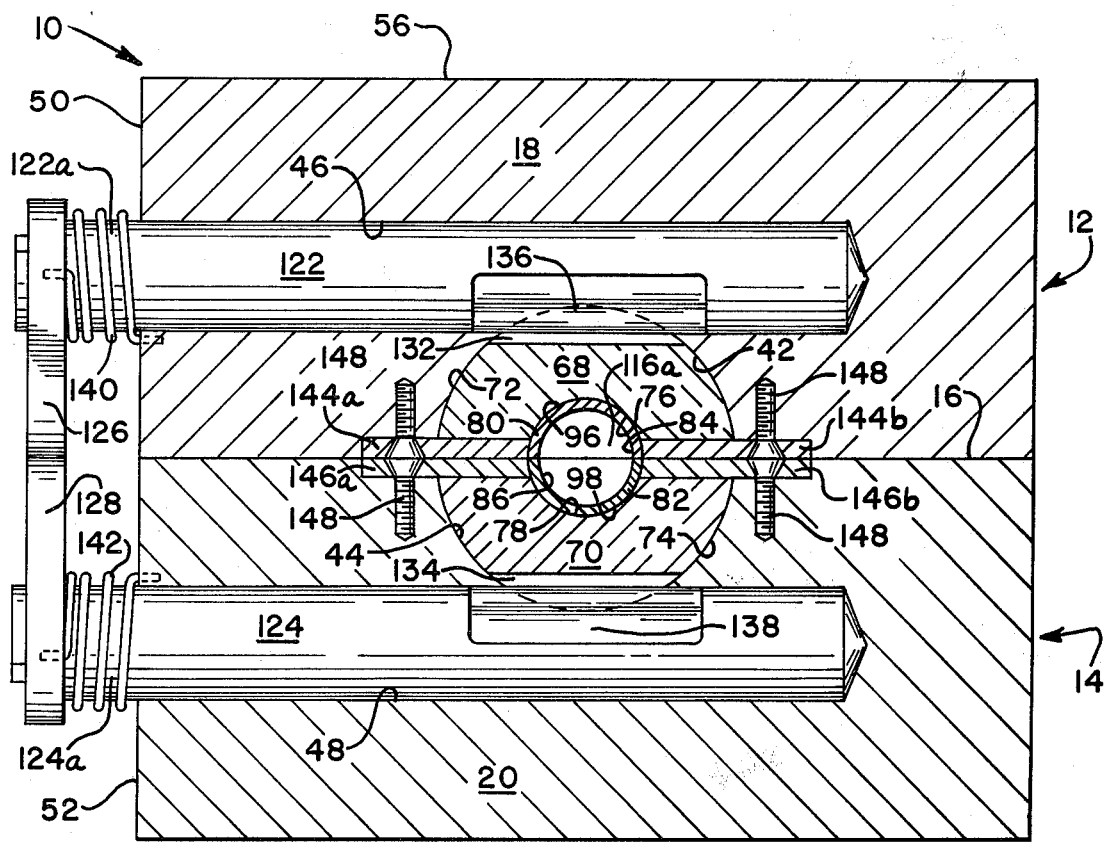
FIG_3
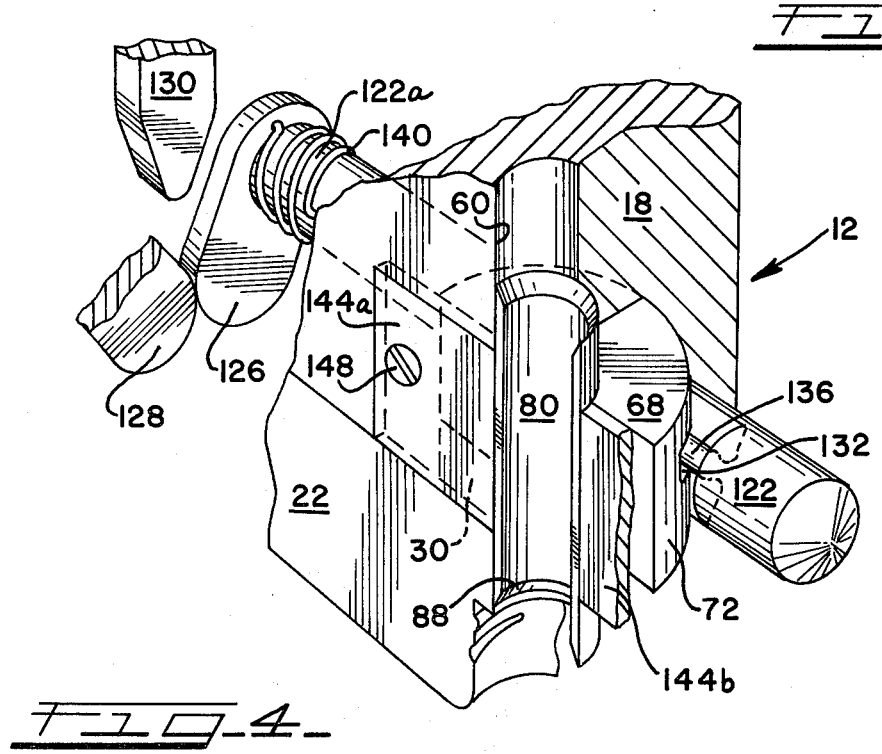
FIG_4

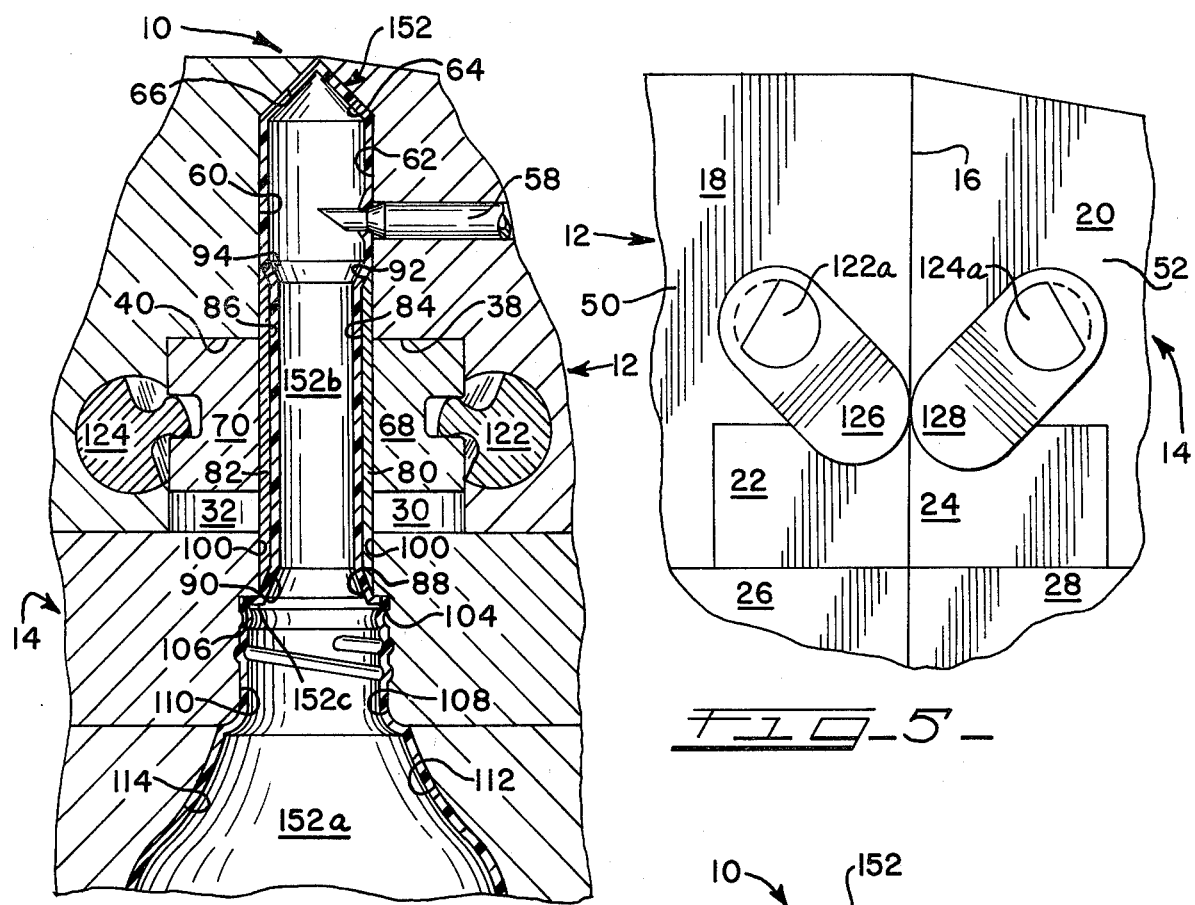
FIG-6-
FIG-5-
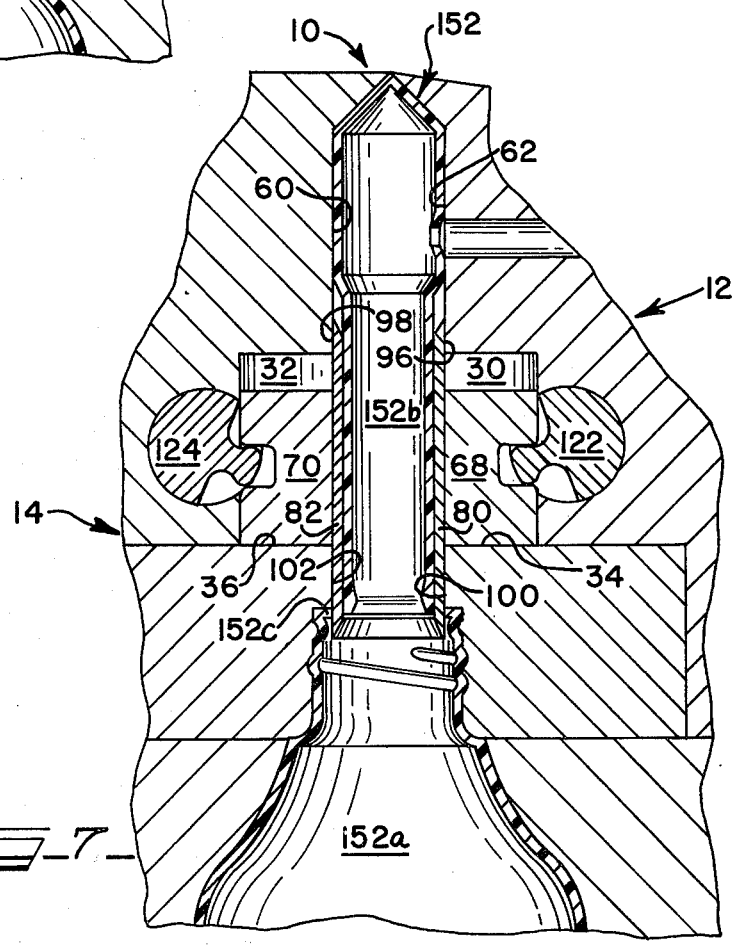
FIG-7-

MOLD HAVING CUTTER MEANS

BACKGROUND OF THE INVENTION

This invention relates to improvements in molds for forming hollow articles, and more particularly to improvements in molds having means for severing a portion of the formed hollow article from the remainder thereof while the article is in the mold.

U.S. Pat. No. 3,869,237, issued Mar. 4, 1975 to E. W. Hellmer and J. P. Kinsley and assigned to the assignee of the present invention, discloses a mold for forming a hollow article having a body portion, an extension portion, and a transverse shoulder joining the body and extension portions. A first mold portion defines a cavity for forming the body portion and transverse shoulder, and a second mold portion defines a cavity extension for forming the extension portion of the article, the cavity extension communicating with the cavity. A pair of partible mold members cooperate to provide the first and second mold portions.

The second mold portion includes a cutter means for severing the extension portion of the formed article from the body portion at the transverse shoulder while the article is in the mold, the cutter means extending outwardly from the second mold portion to the first mold portion and defining a portion of the cavity extension. The second mold portion is axially movable in the direction of the first mold portion to bring the cutter means into cutting relation with the transverse shoulder.

The specification of the aforementioned patent explains that among other advantages in employing such an arrangement, the cutter means is accurately positioned with respect to the formed article, and the axial cutting operation, performed while the article is in the mold, obviates trimming and reaming operations conventionally performed after the hollow article has been removed from the mold.

In the prior arrangement, the extension portion of the formed article, being confined within the second mold portion, is constrained to move with it toward the first mold portion during the cutting operation. This tends to urge the transverse shoulder in the same direction as the cutter means, although movement of the shoulder is somewhat resisted by the body portion of the article, which remains confined within the first mold portion. However, a longer cutting stroke is required than would be the case if the extension portion, and thus the transverse shoulder, were to remain stationary relative to the body portion during the cutting operation.

SUMMARY OF THE INVENTION

In accordance with the present invention, the second mold portion is axially immovable relative to the first mold portion, and the cutter means is axially movable relative to the second mold portion as well as the first mold portion, whereby the cutter means is movable into cutting relation with the transverse shoulder of a formed hollow article without effecting substantial axial movement of the article relative to the mold.

In a preferred embodiment the cutter means is enclosed within the partible mold members, and more particularly, it is mounted within the second mold portion.

Other features, objects and advantages of the invention will be apparent from the ensuing description taken in conjunction with the accompanying drawings.

THE DRAWINGS

In the drawings:

FIG. 1 is a partial sectional view taken through a longitudinal axis of a mold which comprises a pair of partible mold members and which is constructed and adapted to operate in accordance with the invention;

FIG. 2 is a partial elevational view of one of the mold members of FIG. 1 taken along line 2—2 thereof;

FIG. 3 is a transverse sectional view of the mold of FIG. 1 taken along line 3—3 thereof;

FIG. 4 is a perspective view of the mold member of FIG. 2 with portions broken away and associated elements depicted in fragmentary form;

FIG. 5 is a fragmentary elevational view of one side of the mold of FIGS. 1 and 3;

FIG. 6 is a view similar to that of FIG. 1 but includes a partial sectional view of a formed hollow article taken through a longitudinal axis thereof, and depicts movable elements of the mold in one position relative to one another; and FIG. 7 is a view similar to that of FIG. 6 but depicting the movable mold elements in another relative position.

THE PREFERRED EMBODIMENT

Referring to the drawings, a mold 10 for forming a hollow article comprises a pair of mold members or halves 12 and 14 which are partible from one another radially; that is, in opposite directions away from a common plane, the location of which is indicated by a parting line 16. In FIG. 1 the parting line 16 also indicates the location of a central longitudinal axis of the mold. Each mold half is made up of three principal structural elements, namely an upper block 18, 20, a neck finish insert 22, 24, and a lower block 26, 28, secured together by any suitable means (not shown). While such a construction affords great convenience, flexibility and economy in making up molds for producing plastic bottles, for example, having an unlimited variety of configurations and neck finishes, it will be recognized that each mold half 12, 14 may comprise a single integral member. Similarly, any two of the three principal structural elements may be integral with one another.

Each upper block 18, 20 is formed with a yoke guide recess 30, 32 defined by a planar lower stop surface 34, 36 which comprises an upper surface of the respective neck insert 22, 24, a planar upper stop surface 38, 40 and a cylindrical yoke guide surface 42, 44 generated about the central axis of the mold.

Intersecting each yoke guide recess 30, 32 is a cylindrical shaft bore 46, 48 which also intersects an outer lateral surface 50, 52 of the respective upper block (FIG. 3). The axes of the shaft bores are parallel with each other and normal to the central axis of the mold.

A blow needle bore 54 is provided in one (18) of the upper blocks. As shown in the drawings, the axis of bore 54 is normal to the axes of shaft bores 46 and 48 and to the central axis of the mold, entering upper block 18 from an outer lateral surface 56 thereof (FIG. 3), but it may take any of a number of angles with the central axis of the mold and may enter from any suitable outer surface of either upper block. A hollow blow needle 58 is received in bore 54 for reciprocating movement relative to upper block 18 in conventional manner.

In an upper portion of each upper block 18, 20 there is formed about the central axis of the mold an upper cutter guide surface 60, 62 of cylindrical form, which at its lower end intersects the respective upper stop surface 38, 40 of recess 30, 32 and at its upper end intersects a conical pinch-off surface 64, 66. Surface 60 is intersected by blow needle bore 54.

Within each yoke guide recess 30, 32 there is received a cutter support element or yoke 68, 70 having an axial dimension smaller than that of the recess to permit reciprocating movement of the support yoke between the respective upper stop surface 38, 40 and lower stop surface 34, 36. Each support yoke is provided with an outer cylindrical bearing surface 72, 74 complementary to and slidably engaged with the respective yoke guide surface 42, 44.

Each support yoke is also provided with an inner cylindrical cutter support surface 76, 78 axially aligned with and having the same radial dimension as the respective upper cutter guide surface 60, 62. Carried by each of the support yokes 68, 70 is a cutter element 80, 82, a central portion of which is affixed to the respective cutter support surface 76, 78, as by brazing or welding for example, whereas opposite end portions of each cutter element extend axially beyond the respective yoke 68, 70. The thickness of cutter elements 80 and 82 is exaggerated in the drawings for reasons of clarity; in practice they may be formed of relatively thin-gauge spring steel.

It will be apparent from the drawings that cutter elements 80 and 82 cooperate to provide a cylindrical cutter means. More particularly each cutter element is provided with an inner cylindrical forming surface 84, 86 coaxial with surface 60, 62 of the respective upper block 18, 20. Each forming surface 84, 86 is intersected by a beveled or frustoconical knife surface 88, 90 at one end of the respective cutter element and at the opposite end by a similarly beveled or upwardly expanding surface 92, 94. An outer cylindrical surface 96, 98 extends from end to end of each cutter element 80, 82.

Each of the neck finish inserts 22, 24 is provided with a lower cutter guide surface 100, 102 intersecting stop surface 34, 36 thereof. Surfaces 100 and 102 are of cylindrical form and are axially aligned with and have the same radial dimension as the corresponding upper cutter guide surfaces 60 and 62 and cutter support surfaces 76 and 78. Outer guide surface 96, 98 of each cutter element 80, 82 is complementary to the respective upper cutter guide surface 60, 62 and lower cutter guide surface 100, 102, whereby the upper blocks 18 and 20 and the neck inserts 22 and 24 cooperate to guide axial movement of the cylindrical cutter means formed by the cutter elements.

Each neck finish insert 22, 24 is further provided with an inner planar semiannular shoulder surface 104, 106 intersected at its radial inner edge by the respective lower cutter guide surface 100, 102 and at its radial outer edge by an inner neck finish surface 108, 110 which may be of complex configuration such as the concavely threaded form depicted in the drawings. Each neck finish surface 108, 110 merges with an inner principal forming surface 112, 114 of the adjacent lower block 26, 28.

Surfaces 104, 106, 108, 110, 112 and 114, together with surfaces not shown in the drawings, cooperate to define a cavity 116. Similarly, surfaces 60, 62, 64, 66, 84, 86, 88, 90, 92, 94, 100 and 102 cooperate to define a cavity extension 116a communicating with the cavity. It will be recognized accordingly, referring to FIG. 1, that cavity 116 is defined by a first or lower mold portion 118 and that cavity extension 116a is defined by a second or upper mold portion 120, shoulder surfaces 104 and 106 establishing an imaginary plane of demarcation between the first and second mold portions.

Actuating means for the cutter elements 80, 82 includes support yokes 68 and 70, a pair of shafts 122 and 124, and a pair of cam followers 126 and 128. Each of shafts 122, 124 is rotatably mounted in a respective one of shaft bores 46, 48 and is restrained against longitudinal movement thereof relative to mold 10 by any suitable means (not shown). An end portion 122a, 124a of each shaft extends outwardly of the respective mold half 12, 14. Each of cam followers 126 and 128 is carried on a respective one of the shaft end portions and is keyed thereto in any suitable manner such as that shown in FIG. 5. The cam followers are engageable with a cam 130 (FIG. 4) of suitable configuration.

Shafts 122 and 124 and support yokes 68 and 70 are provided with interengaging means, whereby to translate rotary motion of the shafts into axial movement of the yokes. More particularly, a transverse groove 132, 134 of generally rectangular cross section is provided in a respective one of yoke bearing surfaces 72, 74. Each shaft 122, 124 is formed with an elongate lobe 136, 138 received in a respective one of the grooves and engageable with the side walls thereof. It will be apparent that the lobe-and-groove arrangement constitutes a simple form of rack and pinion and that more refined forms may be substituted.

Cam followers 126 and 128, and thus shafts 122 and 124, support yokes 68 and 70 and cutter elements 80 and 82, are biased by means of coil springs 140 and 142 towards the relative positions shown in FIGS. 1 to 6 in which the cutter means is inoperative. These positions are established by the engagement of support yokes 68 and 70 with upper stop surfaces 38 and 40, respectively. Specifically, shaft 122 is urged by spring 140 in a clockwise rotary direction and shaft 124 by spring 142 in a counterclockwise direction, as viewed in FIG. 1.

Means for retaining each of support yokes 68 and 70 in the respective recess 30, 32 is provided by a pair of keeper plates 144a and 144b, 146a and 146b secured by means of machine screws 148 within rectangular recesses provided in upper blocks 18 and 20 immediately adjacent to and communicating with yoke guide recesses 30 and 32. One such keeper plate recess 150 has been made visible in FIG. 2 by omitting the corresponding keeper plate 144b (FIGS. 3 and 4). Support yokes 68 and 70 and cutter elements 80 and 82 are slideably engaged with the adjacent keeper plates.

Referring to FIG. 6, mold 10 is shown with a hollow article 152 formed therein, the hollow article being shown in a section taken through a central longitudinal axis thereof and having a body portion 152a, an extension portion 152b, and a transverse shoulder 152c joining the body portion and the extension portion. Body portion 152a is formed in cavity 116 and conforms to neck finish surfaces 108 and 110 and principal forming surfaces 112 and 116, while transverse shoulder 152c conforms to shoulder surfaces 104 and 106 and is therefore of annular configuration. Extension portion 152 is formed in cavity extension 116a and conforms to a number of surfaces, sequentially consisting of the lowermost portions of lower cutter guide surfaces 100 and 102, knife surfaces 88 and 90, forming surfaces 84 and 86, expanding surfaces 92 and 94, the uppermost portions of upper cutter guide surfaces 60 and 62, and pinch-off surfaces 64 and 66.

OPERATION

A mold such as mold 10 constructed and adapted to operate in accordance with the present invention may be incorporated in any one of a greater number of molding systems. By way of example, it will be readily apparent to persons skilled in the art that such a mold may be employed in the molding machine disclosed in the aforementioned U.S. Pat. No. 3,869,237 with only minor modification of certain features of the machine. Similarly, many of the accessory features of the mold described and illustrated in the prior patent may be used in association with the mold of the present invention and will require little or no modification.

Before the conditions illustrated in FIG. 6 are achieved, mold halves 12 and 14 are spaced from each other radially and positioned on opposite sides of a tube of synthetic resinous material in a softened state. The mold halves are then brought together radially to enclose a portion of the tube within cavity 116 and cavity extension 116a, thereby forming the mold as it is illustrated in the drawings and severing the enclosed portion of the tube from adjacent portions thereof by means of pinch-off surfaces 64 and 66 and similar pinch-off surfaces (not shown) axially opposed thereto and provided in lower blocks 26 and 28.

Next, blow needle 58 is advanced from the position indicated in FIG. 1 to that shown in FIG. 6, thereby piercing the wall of the enclosed tube portion. A gas under pressure is introduced by way of the blow needle to the interior of the enclosed tube portion in well-known manner to expand it into conformity with the surfaces defining cavity 116 and cavity extension 116a, thereby forming hollow article 152. Vent means (not shown) may be formed in mold halves 12 and 16 to facilitate the blowing operation by providing communication between cavity 116 and/or cavity extension 116a and the ambient.

Mold 10 and hollow article 152 are now in the respective conditions illustrated in FIG. 6. Next, flow of blowing gas is halted and blow needle 58 is withdrawn. The material of hollow article 152 is permitted to set until it achieves a stiffness sufficient to perform the cutting operation to be described hereinbelow. In the case of thermoplastics, the period required for the material to set to such a degree is dependent on a number of variables including the physical properties of the plastic material and the initial temperature thereof, the wall thickness of the formed hollow article, the temperature of the mold surfaces with which the hollow article is in contact, and the thermal conductivity of the material of the mold. As a broad indication of the time required, a polyethylene article having an average wall thickness of between 20 and 30 mils will achieve the required stiffness within roughly six seconds after it is fully expanded, using a steel mold which is cooled somewhat below room temperature by any suitable means (not shown).

When the required stiffness has been achieved, the cutting operation is performed by engaging cam followers 126 and 128 with cam 130. More particularly, referring to FIG. 4, relative motion is effected between cam followers 126 and 128, on the one hand, and cam 130 on the other hand to cause the cam to pass between and in engagement with the cam followers. Cam follower 126 will thus be rotated in a counterclockwise direction as viewed in FIG. 4 against the bias of spring 140, while cam follower 128 is rotated simultaneously in a clockwise direction against the bias of spring 142. The cam followers being keyed to shafts 122 and 124, the latter will be rotated from the positions shown in FIG. 6 towards the positions shown in FIG. 7.

The previously described interengagement of shafts 122 and 124 and support yokes 68 and 70 acts to translate the rotary movement of the shafts into downward axial movement of the yokes and of cutter elements 80 and 82 carried thereby, this movement being guided by the sliding engagement of yoke bearing surfaces 72 and 74 with yoke guide surfaces 42 and 44, and by the sliding engagement of outer surfaces 96 and 98 of the cutter elements with upper cutter guide surfaces 60 and 62 and with lower cutter guides surfaces 100 and 102.

As downward movement of cutter elements 80 and 82 is continued, they encounter and engage transverse shoulder 152c of the formed hollow article 152, and as the downward movement continues further, they act to sever extension portion 152b of the article from body portion 152a thereof by effecting an annular cut or line of severance in the transverse shoulder. Knife surfaces 88 and 90 act in the manner of cams by engaging the lowermost end of the now-severed extension portion to effect complete separation of the extension portion from the body portion.

Rotation of shafts 122 and 124, and the consequent downward movement of support yokes 68 and 70 and cutter elements 80 and 82, is continued until the yokes engage lower stop surfaces 34 and 36, whereby the shafts, support yokes and cutter elements will be in the relative positions shown in FIG. 7, extension portion 152b of the formed hollow article now being completely severed from body portion 152a thereof.

Cam 130 may now be disengaged from cam followers 126 and 128 to permit shafts 122 and 124, support yokes 68 and 70, and cutter elements 80 and 82 to be returned to the relative positions shown in FIG. 6 by the biasing action of spring 140. Finally, mold halves 12 and 14 may be parted radially to eject the now-separated portions 152a and 152b of the formed hollow article 152. Suitable ejection means (not shown) may be provided to assist the ejection operation.

It will be noted that during the cutting operation described hereinabove cutter elements 80 and 82 are entirely enclosed within mold halves 12 and 14, that the second or upper mold portion 120 (FIG. 1) is axially immovable relative to the first or lower mold portion 118, and that cutter elements 80 and 82 are moved axially relative to the upper mold portion 120 as well as to the lower mold portion 118, whereby the cutter elements are moved into cutting relation with transverse shoulder 152c of the formed hollow article 152 without effecting substantial axial movement of the article or any portion thereof relative to mold 10.

While the invention has been described in connection with a specific embodiment thereof, it is to be understood that this is by way of illustration and not of limitation; and that the scope of the appended claims should be construed as broadly as the prior art will permit.

What is claimed is:

1. In a mold for forming a hollow article about a central axis of the mold, the article having a body portion, an extension portion, and a transverse shoulder joining the body portion and the extension portion, the mold having a first mold portion defining a cavity for forming the body portion and transverse shoulder of a hollow article, and a second mold portion defining a cavity extension communicating with the cavity for forming the extension portion of a hollow article, the mold comprising a pair of partible mold members cooperating to provide the first and second mold portions, a cutter means, and actuating means for moving the cutter means axially relative to the first mold portion and into cutting relation with the transverse shoulder of a formed hollow article to sever the extension portion thereof from the body portion thereof while the formed hollow article is in the mold, the improvement comprising the features that the second mold portion is axially immovable relative to the first mold portion, and the cutter means is axially movable relative to the second mold portion, whereby the cutter means is movable into said cutting relation without effecting substantial axial movement of a formed hollow article relative to the mold.

2. In a mold as defined in claim 1, the further improvement comprising the feature that the cutter means is enclosed within the partible mold members.

3. In a mold as defined in claim 2, the further improvement comprising the feature that the cutter means is mounted within the second mold portion.

4. In a mold as defined in claim 3, the further improvement comprising the feature that the cutter means is provided with an inner surface defining a portion of the cavity extension.

5. In a mold as defined in claim 1, the further improvement comprising the feature that the cutter means comprises a pair of cutter elements, each of the cutter elements being mounted within a respective one of the partible mold members.

6. In a mold as defined in claim 1, the further improvement comprising the features that the cutter means comprises a pair of cutter elements, and the actuating means includes a pair of support elements, each of the support elements being mounted for reciprocating axial movement within a respective one of the partible mold members, each of the cutter elements being carried by a respective one of the support elements.

7. In a mold as defined in claim 6, the further improvement comprising the features that each of the partible mold members is provided with an inner surface defining a recess for receiving the respective support element, the support element having a surface slidably engageable with the recess-defining surface.

8. In a mold as defined in claim 7, the further improvement comprising means for retaining the support element in the recess.

9. In a mold as defined in claim 6, the further improvement comprising the feature that the actuating means includes a pair of shaft means, each of the shaft means being rotatably mounted in a respective one of the partible mold members adjacent to the respective support element, the shaft means and the support element being provided with interengaging means whereby rotation of the shaft means is translated into axial movement of the support means and the cutter element carried thereby.

10. In a mold as defined in claim 9, the further improvement comprising the feature that an end portion of each of the shaft means extends outwardly of the respective mold member, the actuating means including a cam follower carried on the end portion, and means biasing each shaft means in one rotary direction towards a position in which the cutter means is inoperative, each cam follower being actuable to rotate the respective shaft means in the opposite rotary direction to urge the cutter means into said cutting relation.

* * * * *